(12) United States Patent
Hashigami et al.

(10) Patent No.: US 7,912,507 B2
(45) Date of Patent: Mar. 22, 2011

(54) AMPLIFIER GAIN CONTROL METHOD AND APPARATUS IN MULTI-ANTENNA RADIO SYSTEM

(75) Inventors: Takahito Hashigami, Kawasaki (JP); Toshiaki Funakubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 894 days.

(21) Appl. No.: 11/702,037

(22) Filed: Feb. 2, 2007

(65) Prior Publication Data

US 2007/0161408 A1 Jul. 12, 2007

Related U.S. Application Data

(63) Continuation of application No. PCT/JP2004/014385, filed on Sep. 30, 2004.

(51) Int. Cl.
*H04M 1/00* (2006.01)
(52) U.S. Cl. .......... 455/562.1; 455/273; 455/575.7; 342/383; 342/382; 343/853
(58) Field of Classification Search .......... 343/380, 343/853, 700 MS; 370/342, 279; 342/368, 342/380, 371, 383; 375/267, 299, 347, 346; 455/424, 425, 561, 456.5, 456.6, 550.1, 575.1, 455/3.01, 232.1, 232.2, 234.1, 272, 277.1, 455/273, 419, 420, 13.1, 13.3, 562.1, 575.7, 455/127.1, 127.3, 137, 138
See application file for complete search history.

(56) References Cited

U.S. PATENT DOCUMENTS

| | | | | |
|---|---|---|---|---|
| 3,876,947 A | * | 4/1975 | Giraudon | 455/253.2 |
| 4,228,436 A | * | 10/1980 | DuFort | 342/371 |
| 4,228,544 A | * | 10/1980 | Guyton | 455/282 |
| 4,500,883 A | * | 2/1985 | Gutleber | 342/383 |
| 4,872,016 A | * | 10/1989 | Kress | 342/380 |
| 4,876,548 A | * | 10/1989 | Lopez | 342/368 |
| 4,916,460 A | * | 4/1990 | Powell | 343/853 |
| 4,972,505 A | * | 11/1990 | Isberg | 455/3.01 |
| 6,035,218 A | * | 3/2000 | Oh et al. | 455/562.1 |
| 6,366,789 B1 | * | 4/2002 | Hildebrand | 455/561 |
| 7,006,810 B1 | * | 2/2006 | Winters et al. | 455/277.1 |

(Continued)

FOREIGN PATENT DOCUMENTS

CN 1167376 A 12/1997

(Continued)

OTHER PUBLICATIONS

Chinese Office Action dated Sep. 25, 2009 for Chinese Application No. 200480044125.9. A partial English language translation of the Chinese Office Action is attached.

*Primary Examiner* — Duc Nguyen
*Assistant Examiner* — Charles Chow
(74) *Attorney, Agent, or Firm* — Fujitsu Patent Center

(57) ABSTRACT

A base transceiver station (BTS) identifies the number of currently connected antenna units by receiving a signal to which 1 is added in each antenna unit via a signal line (16) connecting the antenna units (AU1 to AUn) in series. The target output power of each antenna unit, which is obtained by dividing the total target output power of the antenna units by the number of currently connected antenna units, is passed to each antenna unit via a signal line (14) connecting the antenna units in series. Each antenna unit controls the gain of a variable gain amplifier so that its output power becomes equal to the target output power.

3 Claims, 2 Drawing Sheets

U.S. PATENT DOCUMENTS

| | | | |
|---|---|---|---|
| 7,280,848 B2 * | 10/2007 | Hoppenstein | 455/561 |
| 7,421,288 B2 * | 9/2008 | Funakubo | 455/562.1 |
| 7,554,964 B2 * | 6/2009 | Bolgiano et al. | 370/342 |
| 2003/0162516 A1 * | 8/2003 | Solum | 455/234.1 |
| 2004/0106387 A1 * | 6/2004 | Bauman et al. | 455/232.1 |
| 2004/0146013 A1 * | 7/2004 | Song et al. | 370/279 |
| 2005/0136872 A1 * | 6/2005 | Yoshizawa et al. | 455/232.1 |
| 2008/0081588 A1 * | 4/2008 | Rofougaran | 455/272 |

FOREIGN PATENT DOCUMENTS

| | | |
|---|---|---|
| JP | 58-39128 A | 3/1983 |
| JP | 6-164434 A | 6/1994 |
| JP | 2000-307325 A | 11/2000 |
| JP | 2001-285158 A | 10/2001 |
| JP | 2003-152611 A | 5/2003 |

* cited by examiner

AMPLIFIER GAIN CONTROL METHOD AND APPARATUS IN MULTI-ANTENNA RADIO SYSTEM

CROSS-REFERENCE TO RELATED APPLICATIONS

This is a continuation of International Application PCT/JP2004/014385, published in Japanese, with an international filing date of Sep. 30, 2004.

TECHNICAL FIELD

The present invention relates to a method and an apparatus for controlling the gain of a variable-gain amplifier provided in each antenna unit in a multi-antenna radio system comprising a plurality of antenna units and a base transceiver station connected via a signal path connecting the plurality of antenna units in series.

BACKGROUND ART

PCT/JP03/05612 and PCT/JP03/13731, both unpublished as of the date of filing of this application, disclose a multi-antenna radio system in which a plurality of antenna units are connected to one base transceiver station in order to reduce radio dead zones inside buildings or in underground shopping areas and the like, by utilizing the characteristic that RAKE reception is possible in a CDMA (Code Division Multiple Access) system. At each antenna unit, the received signal is amplified by a variable gain amplifier and converted by an A/D converter into a digital signal. The plurality of antenna units and the base transceiver station are connected in series, the base transceiver station being located at one end (upstream end); in this configuration, the antenna unit located at the other end (downstream end) passes the digital signal of its received signal to its upstream adjacent antenna unit where the digital value of its received signal is added to the digital value of the received signal received from its downstream adjacent antenna unit, and the process is repeated from one antenna unit to the next, the base transceiver station thus receiving the sum of all the received signals. The base transceiver station reconstructs the signal for each channel by performing RAKE combining on the sum of the received signals for each spreading code.

In such a multi-antenna radio system, to make the most of the advantage that an arbitrary number of antenna units can be connected to one base transceiver station, it is desired that the gain of the variable gain amplifier in each antenna unit be automatically controlled so that the power value of the sum of the received signals that the base transceiver station receives will fall within an optimum range even when the number of connected antenna units changes.

Patent document 1: Japanese Unexamined Patent Publication No. 2003-152611
Patent document 1: Japanese Unexamined Patent Publication No. 2001-285158

DISCLOSURE OF THE INVENTION

Problem to be Solved by the Invention

It is accordingly an object of the present invention to provide a method and apparatus for appropriately controlling amplifier gain for the received signal of each antenna unit in a multi-antenna radio system.

Means for Solving the Problem

According to the present invention, there is provided, a method of controlling the gain of a received-signal amplifier provided in each of a plurality of antenna units, in a multi-antenna radio system comprising the plurality of antenna units and a base transceiver station that receives the sum of received signals of the plurality of antenna units via a first signal path connecting the antenna units in series, comprising:

receiving, at the base transceiver station, a signal indicating the number of antenna units via a second signal path connecting the antenna units in series;

computing, at the base transceiver station, a target power value for each of the antenna units by dividing a target value for the total power of the received signals by the number of antenna units;

receiving, at each of the antenna units, the target power value via a third signal path connecting the antenna units in series; and controlling, at each of the antenna units, the gain of the received-signal amplifier so that the power value of the received signal becomes equal to the target power value.

BEST MODE FOR CARRYING OUT THE INVENTION

Figure 1:
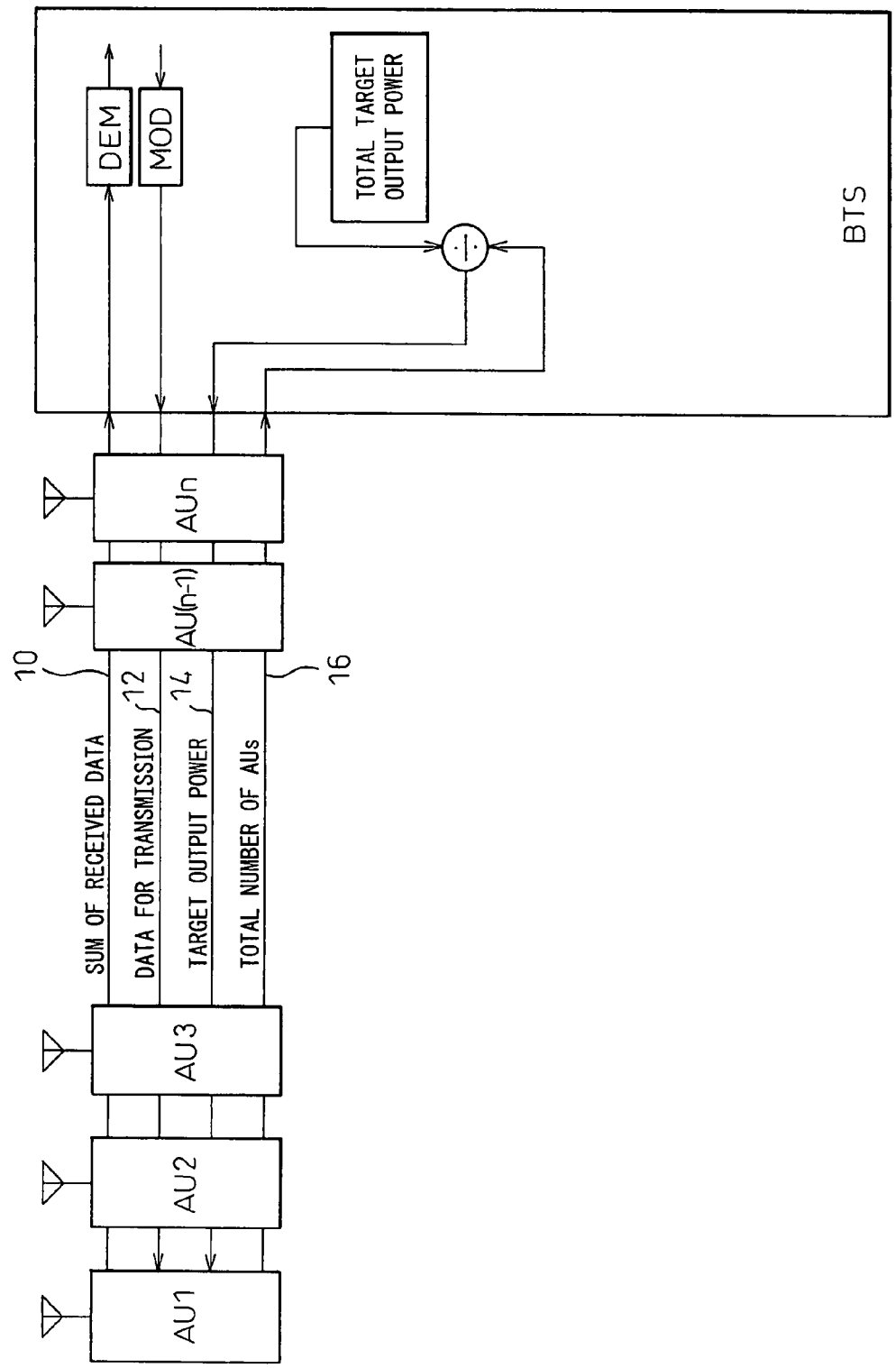
FIG. 1 is a block diagram showing the configuration of a multi-antenna radio system according to one embodiment of the present invention.
Figure 2:
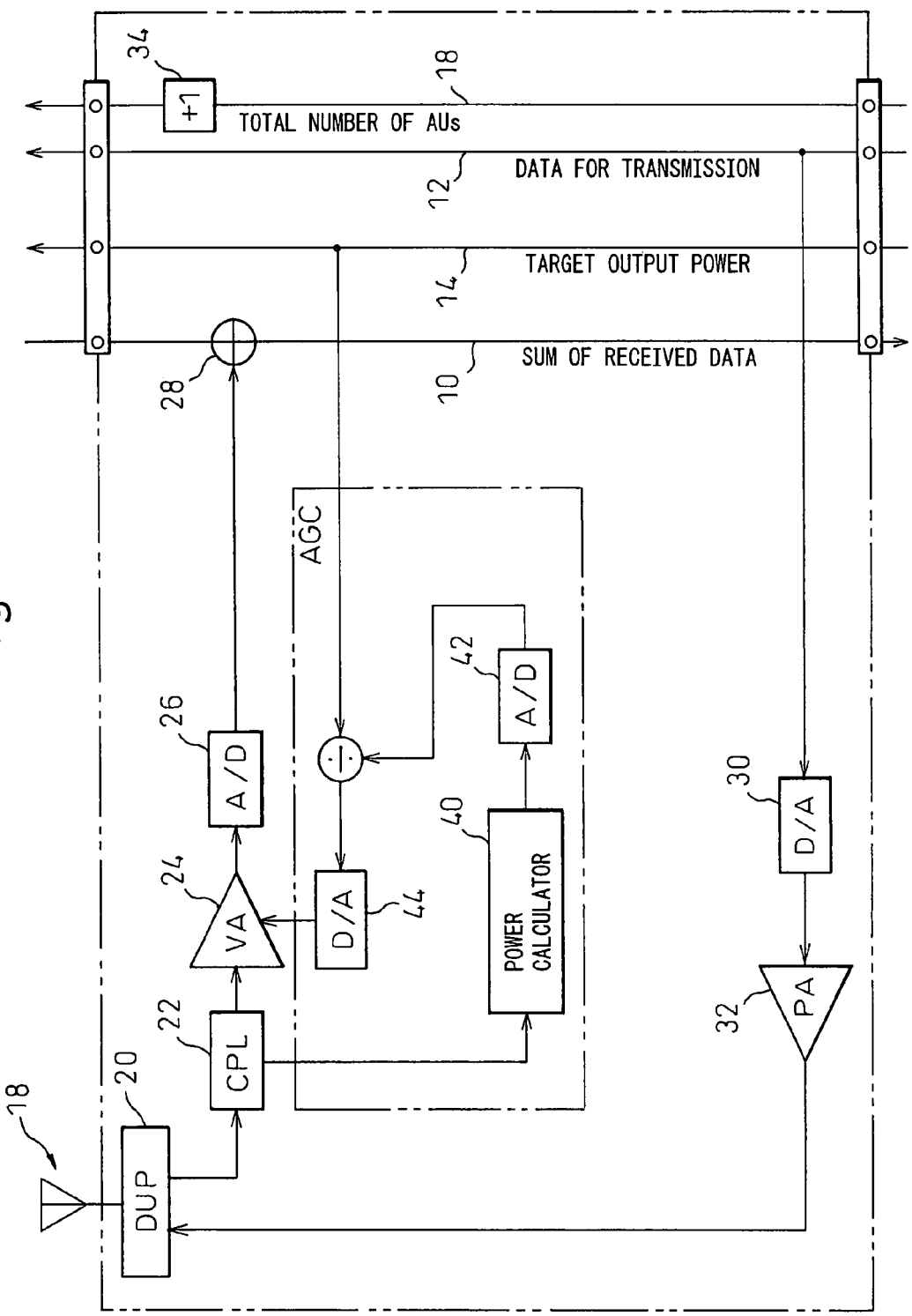
FIG. 2 is a block diagram showing the detailed configuration of an antenna unit.

FIG. 1 shows the configuration of a multi-antenna radio system equipped with an automatic gain control function according to one embodiment of the present invention and, in particular, the detailed configuration of a base transceiver station (BTS), and FIG. 2 shows the detailed configuration of each antenna unit (AU1 to AUn).

In FIG. 1, signals lines 10, 12, 14, and 16 connect the antenna units AU1 to AUn and the base transceiver station (BTS) in series. The sum value of the received signals obtained at the respective AUs is transferred on the signal line 10. That is, the data received by the antenna 18 of each AU (FIG. 2) and passed through a duplexer 20 and a coupler 22 is amplified by a variable gain amplifier 24 and converted by an A/D converter 26 into a digital signal, which is then added in an adder 28 to the received data passed from the AU adjacent on the downstream side (the left side in FIG. 1), and the resulting sum is passed to the AU adjacent on the upstream side (the right side in FIG. 1). In this way, the received data from the respective AUs are summed together, and the resulting sum data is received by the BTS located at the upstream end. Data transmitted from the BTS is transferred on the signal line 12, and each AU converts it into an analog signal by a D/A converter 30 and amplifies the signal by a power amplifier 32; the amplified signal is then coupled to the antenna 18 through the duplexer 20 and radiated into space.

On the signal line 16, the signal to which 1 is added by an adder 34 in each AU, as shown in FIG. 2, is transferred from the downstream to the upstream side. The BTS can thus identify the number of currently connected AUs. As shown in FIG. 1, in the BTS, the value of the total target output power is divided by the total number of AUs, and the result is passed to each AU as the target output power via the signal line 14.

In each AU, as shown in FIG. 2, a power calculator 40 calculates the power of the input separated by the coupler 22 for coupling to the variable gain amplifier 24, and an A/D converter 42 converts it into a digital value. Then, the value of the target output power transferred via the signal line 14 is divided by this input power, and the result is converted by a D/A converter 44 into an analog signal which is supplied as a gain set value to the variable gain amplifier 24.

With the above control, the power of the received data of each AU is controlled to a value equal to the quotient of the total target output power by the number of AUs. As a result, the sum of the received data that the BTS receives is controlled to an optimum value regardless of the number of AUs; that is, the sum is automatically controlled to an optimum value even when the number of AUs changes during operation.

Instead of calculating the input power to the amplifier 24 and setting the quotient of the target output power by the input power as the gain of the amplifier 24, the output power of the amplifier 24 may be measured and compared with a target value, and the result of the comparison may be fed back to the gain of the amplifier thereby controlling the output power to the target value.

The invention claimed is:

1. A method of controlling a gain of a received-signal amplifier provided in each of a plurality of antenna units, in a multi-antenna radio system comprising the plurality of antenna units and a base transceiver station that receives a sum of received signals of the plurality of antenna units via a first signal path connecting the antenna units in series, comprising:
   receiving, at the base transceiver station, a signal indicating a number of antenna units via a second signal path connecting the antenna units in series, wherein the signal indicating a number of antenna units is generated by transferring, on the second signal path, a signal to which 1 is added by an adder in each of the plurality of antenna units, from a downstream antenna unit to an upstream antenna unit;
   computing, at the base transceiver station, a target power value common to each of the antenna units by dividing a target value for the total power of the received signals by the number of antenna units;
   receiving, at each of the antenna units, the target power value via a third signal path connecting the antenna units in series; and
   controlling, at each of the antenna units, the gain of the received-signal amplifier so that the power value of the received signal becomes equal to the target power value.

2. An apparatus for controlling a gain of a received-signal amplifier provided in each of a plurality of antenna units, in a multi-antenna radio system comprising the plurality of antenna units and a base transceiver station that receives a sum of received signals of the plurality of antenna units via a first signal path connecting the antenna units in series, comprising:
   a first receiving unit, at the base transceiver station, configured to receive a signal indicating a number of antenna units via a second signal path connecting the antenna units in series, wherein the signal indicating a number of antenna units is generated by transferring, on the second signal path, a signal to which 1 is added by an adder in each of the plurality of antenna units, from a downstream antenna unit to an upstream antenna unit;
   a computing unit, at the base transceiver station, configured to compute a target power value common to each of the antenna units by dividing a target value for the total power of the received signals by the number of antenna units;
   a second receiving unit, at each of the antenna units, configured to receive the target power value via a third signal path connecting the antenna units in series; and
   a controlling unit, at each of the antenna units, configured to control the gain of the received-signal amplifier so that the power value of the received signal becomes equal to the target power value.

3. An antenna unit which controls a gain of a received-signal amplifier, in a multi-antenna radio system comprising a plurality of antenna units and a base transceiver station that receives a sum of received signals of the plurality of antenna units via a first signal path connecting the antenna units in series, the antenna unit comprising:
   a transmitting unit configured to transmit a signal indicating a number of antenna units via a second signal path connecting the antenna units, wherein the signal indicating a number of antenna units is generated by adding 1 to a signal received from an downstream antenna unit via the second signal path;
   a receiving unit configured to receive a target power value common to each of the antenna units, which is computed at the base transceiver station by dividing a target value for the total power of the received signals by total number of antenna units, via a third signal path connecting the antenna units in series; and
   a controlling unit configured to control the gain of the received-signal amplifier so that the power value of the received signal becomes equal to the target power value.

* * * * *